Jan. 3, 1956 — T. F. PETERSON — 2,729,054
HELICALLY-PREFORMED ARMOR FOR LINEAR BODIES
Filed Nov. 19, 1952 — 2 Sheets-Sheet 1
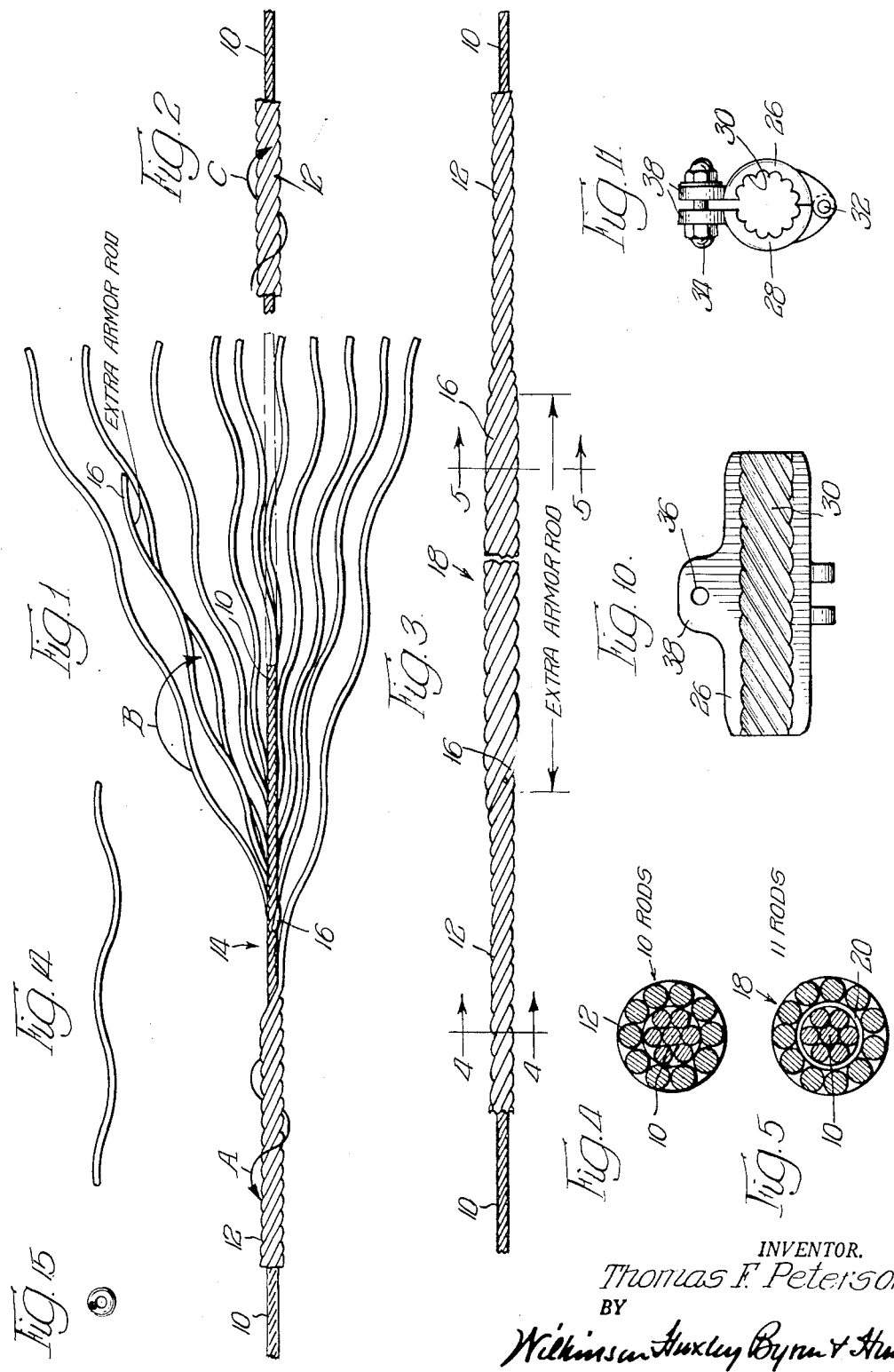

Jan. 3, 1956  T. F. PETERSON  2,729,054
HELICALLY-PREFORMED ARMOR FOR LINEAR BODIES
Filed Nov. 19, 1952  2 Sheets-Sheet 2
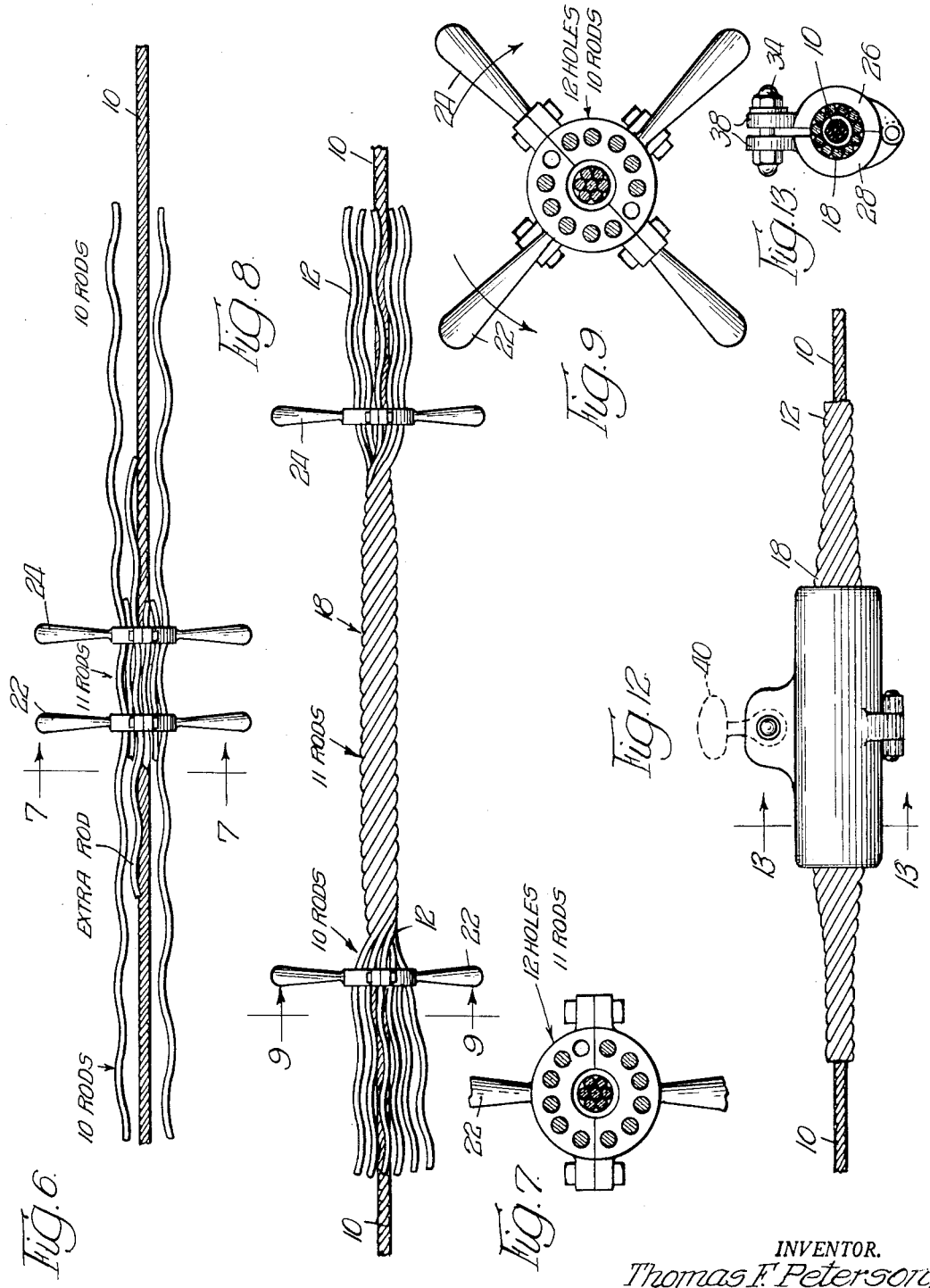
INVENTOR.
Thomas F. Peterson,
BY
Wilkinson Huxley Byron & Hume
Attys.

United States Patent Office 2,729,054
Patented Jan. 3, 1956

2,729,054
HELICALLY-PREFORMED ARMOR FOR LINEAR BODIES

Thomas F. Peterson, Shaker Heights, Ohio

Application November 19, 1952, Serial No. 321,425

7 Claims. (Cl. 57—145)

This invention relates to helically-preformed armor rods, and especially to the adaptation thereof to the clamping, gripping and suspension of stranded bodies, cables, wires, and the like, in such a way as to protect such bodies from abrasion and damage by crushing. The invention is also well adapted to the performance of vibration damping functions in suspended wires and cables, such as electrical transmission lines.

Helically-preformed armor rods as applied today comprise individual wires or rods of a degree of stiffness which when given a helical set will grip and reinforce the wires, cables, or other stranded bodies, around which they are disposed, with considerable gripping force, where the internal diameter of each preformed helix is smaller than the overall diameter of the body of the cable around which it is disposed. The stiffness of the helically-preformed armor rods increases the resistance of the cable or wire to bending and provides an abrasion resisting protector around the latter.

As is disclosed in my copending application Serial No. 230,591, filed June 8, 1951, it has heretofore been proposed by me to supply a sufficient number of helically-preformed reinforcements of a pitch length and hand of lay substantially to agree with the pitch length and hand of lay of a strand or cable of association in surrounding relation to the latter so as substantially to enclose the same in an armoring tube composed of helically-preformed reinforcements. Then, by providing clamp bearings having internal helical grooves or bosses formed to complement the helically-preformed reinforcements when disposed in operative position, the stranded body may be anchored or suspended without subjecting its strands to undue abrasion or pressing forces. The internal grooves or bosses of the bearings of the clamp afford means whereby axial displacement of the armor rods in relation to the clamp is prevented without requiring an excessive amount of clamping pressure. Since the armor rods are thus firmly held, and since they in turn grip the stranded body or cable around which they are disposed, this latter is prevented from slipping axially and is held securely without being subjected to excessive clamping forces which might crush or weaken the component strands.

The present invention teaches an improved technique for enveloping stranded bodies with helically-preformed reinforcements in such a way that the reinforcements throughout a substantial portion of their length firmly grip the stranded body as heretofore proposed, but at some intermediate portion are spaced therefrom while maintaining an encircling position around the body in coaxial relation therewith. The spaced portion defines a tube in surrounding relation to the stranded body, forming an ideal point for engagement of clamps, which, either with or without internal conformations in their bearings, may be set up with even an excessive amount of clamping force without causing the enclosed stranded body to be damaged in any way.

According to the invention, a set of armor rods, usually comprising that number which will normally enclose a stranded body, are selected for disposition around such body for an appreciable portion of its length. During the installation, wherein the rods are laid into place around the stranded body in gripping relation therewith, and at a point approximately in the middle of the rods, one or more shorter lengths of helically-preformed armor rod are forced into the lay. These short lengths are accommodated by crowding the other rods and serve to enlarge the internal diameter of the enveloping armor of which they are a part a sufficient amount to create a space between the armor rods and the stranded body around which they are disposed. The normal complement of armor rods extends along the stranded body in tightly gripping relation thereto beyond each end of the inserted short lengths of helically-preformed rod which make the crowded and enlarged central portion. This latter part need only comprise two or more pitch lengths of the total extent of the helically-preformed armor, although it may be of greater extent as desired, so long as there remains at each end of the enlarged portion a sufficient length of armor rods of normal diameter to surround the stranded body in gripping relation therewith.

The invention will better be understood by reference to the attached drawings, in which—

Figure 1 shows a stranded body having a plurality of helically-preformed armor rods being wrapped therearound in such number to comprise the usual normal complement for completely enclosing the latter. In the illustrated embodiments, the stranded body is shown as a seven-strand cable, and the reinforcements associated therewith are shown to be ten in number, forming the normal complement of rods for completely enclosing the stranded body.

Figure 2 is a fragmentary view similar to Figure 1, comprising a projection of the latter to the opposite end of the assembly, showing the completion of the wrapping operation in which the helically-preformed rods are disposed in position around the stranded body.

Figure 3 is illustrative of the completed installation of helically-preformed armor rods around a stranded body, in the central portion of which an extra armor rod of a shorter length is crowded into position to form an enlarged portion spaced radially from the stranded body.

Figure 4 is a sectional view taken at line 4—4 of Figure 3.

Figure 5 is a sectional view taken at line 5—5 of Figure 3.

Figure 6 is a side elevational view showing the application of helically-preformed armor rods to a wire or stranded body by the use of tools.

Figure 7 is a sectional view taken at line 7—7 of Figure 6.

Figure 8 shows the progression of the installation of armor rods to the stranded body from the starting condition of Figure 6.

Figure 9 is a sectional view taken at line 9—9 of Figure 8.

Figure 10 is a front elevational view of one of two complementary half bearings comprising a clamping device.

Figure 11 is an end view of the assembled clamping device comprising two of the complementary half bearings shown in Figure 10 hinged together.

Figure 12 illustrates the clamping of a stranded body around which helically-preformed armor has been first disposed in accordance with the present invention.

Figure 13 is a sectional view taken along line 13—13 of Figure 12.

Figures 14 and 15 represent a fragmentary side elevational view and an end view, respectively, of a helically-preformed armor rod, such as is used in the practice of the present invention.

In Figure 1 a stranded body 10 has a plurality of helically-preformed armor rods 12 twisted therearound by holding them adjacent one end in surrounding relation to the stranded body and twisting them therearound, as shown, in the direction of the arrow A, which direction is, of course, determined by the hand of the helix into which they are preformed.

As shown in the drawings for purposes of illustration, helically-preformed armor rods having an internal diameter of helix that is slightly smaller than the overall diameter of the stranded body 10 are provided in such number completely to enclose the latter, which number has been assumed to be ten as shown. The twisting of the armor rod progresses, as is indicated by the arrow B, to some intermediate point 14, where an extra armor rod 16 of shorter length than those comprising the normal complement 12, is crowded into the midst of the latter and is laid around the stranded body 10 along with the armor rods comprising the normal complement 12 for the extent of its length. Since the armor rod 16 is shorter than the armor rods 12, the latter are twisted still further, as is indicated in Figure 2 by the arrow C, until they are completely positioned around the stranded body 10. The resulting construction is illustrated in Figure 3.

The intermediate portions 18 of the assembly are of larger diameter than the end portions by virtue of the crowding in of the extra armor rod 16, and this sufficiently increases the internal diameter of the armoring envelope to provide a space between the latter and the stranded body, as appears in Figure 5. This space may be left vacant, or may be filled with resilient, compressible, vibration-absorbing material, such as rubber, neoprene, or other plastic or elastic material of the natural or synthetic resins. The portions of the armor rods 12 may be less in number than that required to provide the normal complete covering so long as the enlarged portion 18 is composed of a greater number of rods than such normal amount. It may thus become necessary to add more short rods than one in the central portion to effect the enlargement.

In the foregoing assembly, it was assumed that the armor rods 12 were applied by starting at one end and wrapping them around the stranded body until the other end of the rods came into place. In Figures 6 to 9, however, an arrangement is provided wherein the armor rods are applied by predisposing them around the stranded body in two or more groups and by starting adjacent the center of the armor rods, twisting them around the stranded body simultaneously. Whereas, this can be accomplished by the use of the hands alone, the principle of the invention is more easily illustrated by the use of tools, a pair of which is shown in Figure 6, which tools have been marked 22 and 24, respectively. In the central portions of the armor rods a shorter length of armor rod is included, as appears in the sectional view of Figure 7. Here, a tool adapted to accommodate twelve armor rods or less is shown, having all of the bearing holes filled but one, so as to constitute a helically-preformed armor rod envelope having eleven rods at the central portions thereof.

As the twisting progresses, as shown by the arrow in Figure 9, an assembly is provided which has the enlarged central portion 18 afforded by the extra rod, and which terminates in the normal complement of ten rods comprising the regular envelope 12 at each of its ends in surrounding relation to the stranded body 10.

The resulting assembly of Figure 8 is for all intents and purposes indentical with that of Figure 3, the differences lying merely in the techniques of application. The central portion 18 in either case is in spaced relation to the stranded body to provide an area of engagement for the clamp shown in Figures 10 to 13. Here, two half-bearing elements 26 and 28, which might optionally be provided with the internal grooving 30 complementary to the outer contours of the armor rods throughout the central portion 18, are disposed around the latter and are closed about a hinge 32 in gripping relation therewith by means of a threaded nut and bolt assembly 34, which is engaged through the eyes 36 in the opposed pair of ears 38 on the half-bearing elements of the clamps. The assembly is shown in Figures 12 and 13. No matter how forcibly the nuts and bolts 34 are actuated to clamp the bearing valves 26 and 28 together, the enlarged central portion of the armoring 18 is sufficient to resist its closing into engagement with the stranded body 10. Suitable means for attachment to an external support are indicated in the broken lines 40 in Figure 12. The clamp here illustrated is but symbolic of any of the many devices which might be adapted to this purpose.

It is obvious from the foregoing that the space 20 provided between the armor rods and the stranded body permits the central portion of the armor to have relative radial and circumferential movement with respect to the latter, which provides an inherent vibration damping characteristic. The torque inertia of the central part may be augmented by the clamping on of eccentric weights of well known design, whereby vibration set up in the stranded body when suspended, as in the case of transmission lines, is expended as torque effort permitted by the clearance of the central portions of the assembly 18 in relation to the stranded body. In this manner, vibrational energy is dissipated by the movement between the helical reinforcements both at the central part 18 and at the terminal portions 12 thereof.

It is further evident from the foregoing description that, whereas the central portions of the reinforcements are spaced from the stranded body, the terminal portions 12 of the reinforcements grip the stranded body for a sufficient axial extent to prevent axial slippage of the stranded body when suspended, and to transmit axial thrust from the stranded body to the clamp 18, and thence to the supports to which it is attached, without crushing the stranded body, while at the same time supporting it and gripping it against abrasion.

I claim:

1. An armoring and reinforcing envelope for wires, cables, and the like, composed of helically-preformed elements of uniform internal helical diameter and uniform pitch as preformed, and of not less than a predetermined length, having at least one substantially shorter helically-preformed element laid-up therewith intermediately of the length of the assembly in crowding relation to the longer elements, said envelope being characterized by a greater helical internal diameter in said intermediate portion than at the terminal portions of the assembly which extend beyond the ends of said shorter element.

2. The invention of claim 1, in which all of said helical elements are preformed to an internal diameter that is less than the external diameter of the wire or cable of association, and, as applied to the latter, have an internal helical diameter substantially agreeing with the external diameter of said wire or cable, the internal diameter of said intermediate portion being larger than the external diameter of said wire or cable.

3. The method of reinforcing and gripping strands which includes applying a plurality of helically-preformed armor rods in surrounding relation to a predetermined length of strand forcibly to grip the same, and, co-incidentally with said application, forcing a helically-preformed armor rod substantially shorter than said predetermined length into the lay of the longer armor rods adjacent the mid-portions of the latter in surrounding relation to the strand to expand the circumferential and diametric dimensions of the assembled armor rods throughout their portions that are coextensive with said shorter length of rod.

4. The method of claim 3, in which the application of the helically-preformed armor rods is accomplished by twisting the longer rods about the strand for a few helical pitch lengths adjacent one end of the rods, inserting at least one additional rod at this point, and completing the twisting to the remote ends thereof.

5. The method of claim 3, in which the application of the helically-preformed armor rods is accomplished by holding the greater number of rods around the strand adjacent their mid-portions and twisting the rods in opposite directions around the strand until the limits of a shorter rod are exceeded, and thereafter completing the twisting of the lesser number of rods about the strand.

6. An attachment for wires, strands, cables, and the like, which comprises a plurality of rods each of which is of substantially uniform gauge throughout its length, said rods being helically preformed into helices of uniform internal diameter and of uniform angle of pitch, some of said rods being longer than the others, the shorter rods being laid-up centrally of said longer rods so that the latter project beyond the ends of the shorter rods for a substantial distance, said shorter and longer rods forming a closed tube portion having an internal diameter that is greater than the internal helical diameter to which each of said rods is preformed.

7. The invention of claim 6, including, in combination, a wire, strand, or cable body of substantially uniform diameter to which said attachment is applied, said tube portion being disposed in surrounding relation to said body and being spaced therefrom radially, the longer rods at each end of said tube portion being wrapped around said body in tightly gripping relation thereto so as to preclude relative axial movement between said body and the attachment.

References Cited in the file of this patent

UNITED STATES PATENTS

| | | |
|---|---|---|
| 321,240 | Patterson | June 30, 1885 |
| 337,513 | Moxham | Mar. 9, 1886 |
| 817,328 | Lloyd | Apr. 10, 1906 |
| 1,873,798 | Varney | Aug. 23, 1932 |
| 2,257,953 | Haskell | Oct. 7, 1941 |
| 2,414,136 | Bodendieck | Jan. 14, 1947 |
| 2,604,509 | Blanchard | July 22, 1952 |

FOREIGN PATENTS

| | | |
|---|---|---|
| 411,940 | Great Britain | June 21, 1934 |

OTHER REFERENCES

"Preformed Armor Rods and Multiple Wire Ties," American Steel and Wire Company. Copyrighted 1946.